US012681716B2

(12) United States Patent
Fukuyo et al.

(10) Patent No.: US 12,681,716 B2
(45) Date of Patent: Jul. 14, 2026

(54) SERVER, SOFTWARE MANAGEMENT SYSTEM, SOFTWARE MANAGEMENT METHOD, AND NON-TRANSITORY STORAGE MEDIUM

(71) Applicant: TOYOTA JIDOSHA KABUSHIKI KAISHA, Toyota (JP)

(72) Inventors: Satoru Fukuyo, Nisshin (JP); Takuya Kawasaki, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 225 days.

(21) Appl. No.: 18/484,977

(22) Filed: Oct. 11, 2023

(65) Prior Publication Data
US 2024/0152352 A1     May 9, 2024

(30) Foreign Application Priority Data
Nov. 4, 2022     (JP) ................................. 2022-177455

(51) Int. Cl.
*G06F 8/65* (2018.01)
*G07C 5/00* (2006.01)
(52) U.S. Cl.
CPC .............. *G06F 8/65* (2013.01); *G07C 5/008* (2013.01)

(58) Field of Classification Search
CPC ......................... G06F 8/60–65; G06F 8/70–71
See application file for complete search history.

(56) References Cited

U.S. PATENT DOCUMENTS

| | | | | |
|---|---|---|---|---|
| 2022/0156054 A1* | 5/2022 | Thomasma | ............. | H04L 67/34 |
| 2022/0317993 A1* | 10/2022 | Taki | ........................... | G06F 8/65 |
| 2023/0205526 A1* | 6/2023 | Xiao | ................... | G06F 9/30047 |
| | | | | 711/210 |
| 2024/0004625 A1* | 1/2024 | Gambhir | ................... | G06F 8/77 |

FOREIGN PATENT DOCUMENTS

| | | | |
|---|---|---|---|
| JP | 2017-149323 A | 8/2017 | |

* cited by examiner

*Primary Examiner* — Duy Khoung T Nguyen
(74) *Attorney, Agent, or Firm* — Oliff PLC

(57) ABSTRACT

A server that is configured to manage software for electronic equipment installed in a vehicle, the server includes: storage in which first software is stored; and one or more processors configured to transmit the first software to the vehicle via a wireless communication device. The one or more processors are configured to determine whether activation processing of second software transmitted from an external server to the vehicle is completed at the electronic equipment, and transmit, when the activation processing of the second software is not completed, the first software to the vehicle after the activation processing of the second software is completed.

12 Claims, 9 Drawing Sheets

<< WITH DIFFERENCE IN FUNCTIONS DUE TO PAYMENT >>

FIG. 8

F I G. 9
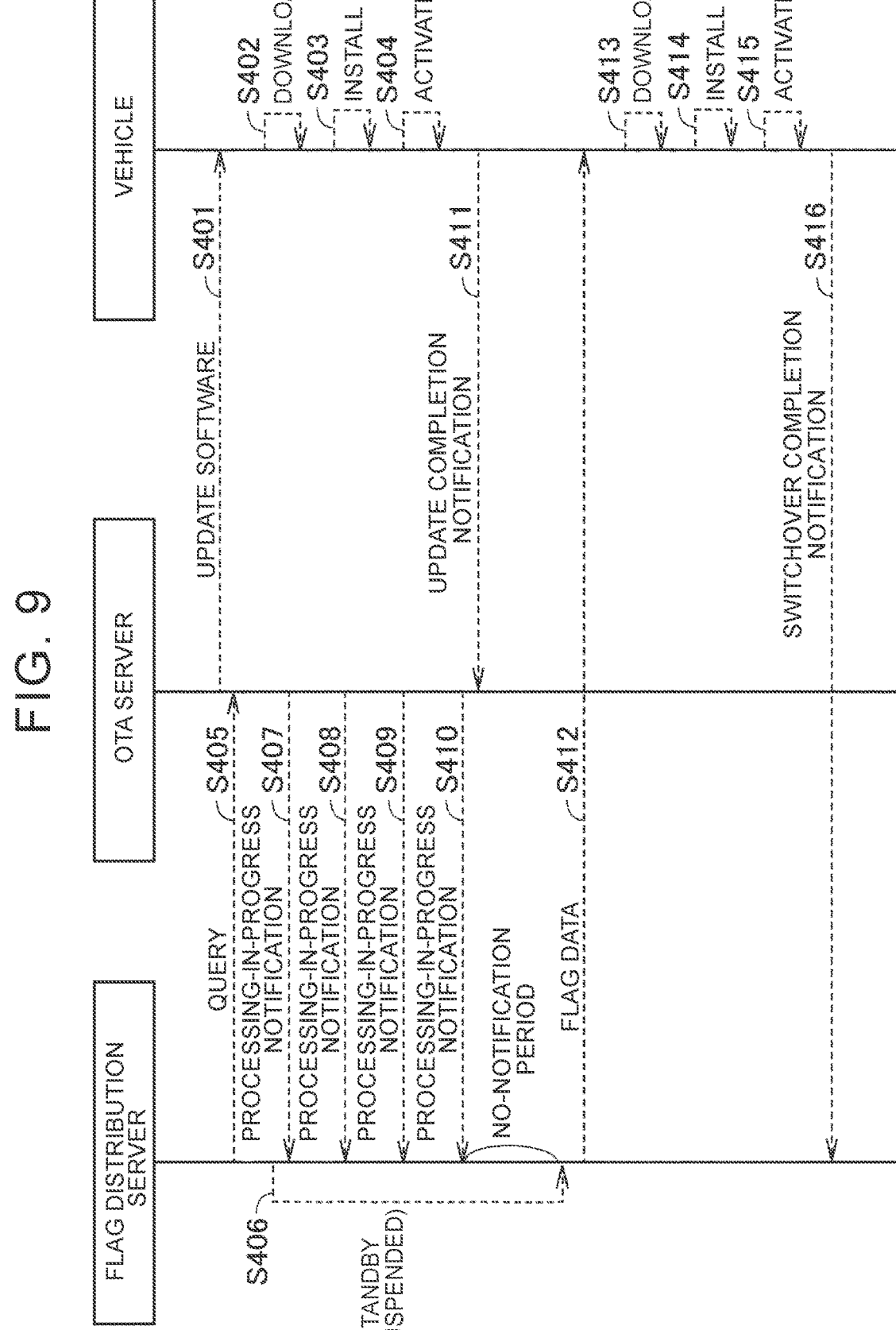

1

SERVER, SOFTWARE MANAGEMENT SYSTEM, SOFTWARE MANAGEMENT METHOD, AND NON-TRANSITORY STORAGE MEDIUM

CROSS-REFERENCE TO RELATED APPLICATION

This application claims priority to Japanese Patent Application No. 2022-177455 filed on Nov. 4, 2022 incorporated herein by reference in its entirety.

BACKGROUND

1. Technical Field

The present disclosure relates to a server, a software management system, a software management method, and a non-transitory storage medium.

2. Description of Related Art

Over-The-Air (OTA) technology for updating software (control programs for vehicles) stored in a control device (electronic control unit (ECU)) for a vehicle through wireless communication has been studied and developed. For example, Japanese Unexamined Patent Application Publication No. 2017-149323 (JP 2017-149323 A) discloses a vehicle control system capable of safely updating software without impairing user convenience. When it is determined that the location of an electronic key of the vehicle is inside of the vehicle, a mobile device transmits a signal requesting a download of update software to a server. An ECU downloads, via the mobile device, the update software transmitted from the server and updates the software.

SUMMARY

A system configuration is conceivable in which a plurality of servers manages software for electronic equipment installed in a vehicle. For example, a server (OTA server) that transmits update software for an ECU, and a server (flag distribution server) that transmits software (so-called flag data) for switching between an enabled state and a disabled state of a specific function that can be executed by the software of the ECU can be provided separately.

In such a system configuration, software transmission schedules may not be sufficiently coordinated between the two servers. When transmission of update software and transmission of flag data are performed at the same time, an error may occur in the ECU that has received the two pieces of software. For example, in an ECU in which part of sequence processing executed in the order of download, checking, and switchover is shared between update software reception processing and flag data reception processing, an error may occur due to flag data reception processing (e.g., downloading flag data) interrupting during execution of update software reception processing (e.g., while checking downloaded software). As a result, additional processing such as retransmission of the software and so forth becomes necessary with these two servers, and there is a possibility that the software cannot be updated smoothly.

The present disclosure provides technology for smoothly updating software of electronic equipment installed in a vehicle.

A server according to a first aspect of the present disclosure is configured to manage software of electronic equipment installed in a vehicle. The server includes storage in which first software is stored; and one or more processors configured to transmit the first software to the vehicle via a wireless communication device. The one or more processors are configured to determine whether activation processing of second software transmitted from an external server to the vehicle is completed at the electronic equipment, and transmit, when the activation processing of the second software is not completed, the first software to the vehicle after the activation processing of the second software is completed.

A software management system according to a second aspect of the present disclosure includes the server according to the first aspect and an external server.

A software management method according to a further third aspect of the present disclosure manages software of electronic equipment installed in a vehicle. The software management method includes: performing a wireless transmission of first software from a computer to the vehicle; and determining whether activation processing of second software wirelessly transmitted to the vehicle from another computer is completed at the electronic equipment. The wireless transmission of the first software includes wirelessly transmitting, when the activation processing of the second software is not completed, the first software to the vehicle after the activation processing of the second software is completed.

A non-transitory storage medium according to a fourth aspect of the present disclosure, stores instructions that are executable by a computer and cause the computer to execute the software management method according to the third aspect.

According to the present disclosure, the software of the electronic equipment installed in the vehicle can be smoothly updated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a sequence diagram showing an example of processing according to a first modification of the first embodiment;

FIG. 9 is a sequence diagram showing an example of processing according to a second modification of the first embodiment.

DETAILED DESCRIPTION OF EMBODIMENTS

Embodiments of the present disclosure will be described below in detail with reference to the drawings. Note that the same or corresponding parts are denoted by the same signs throughout the drawings, and description thereof will not be repeated.

First Embodiment

System Configuration

Figure 1:
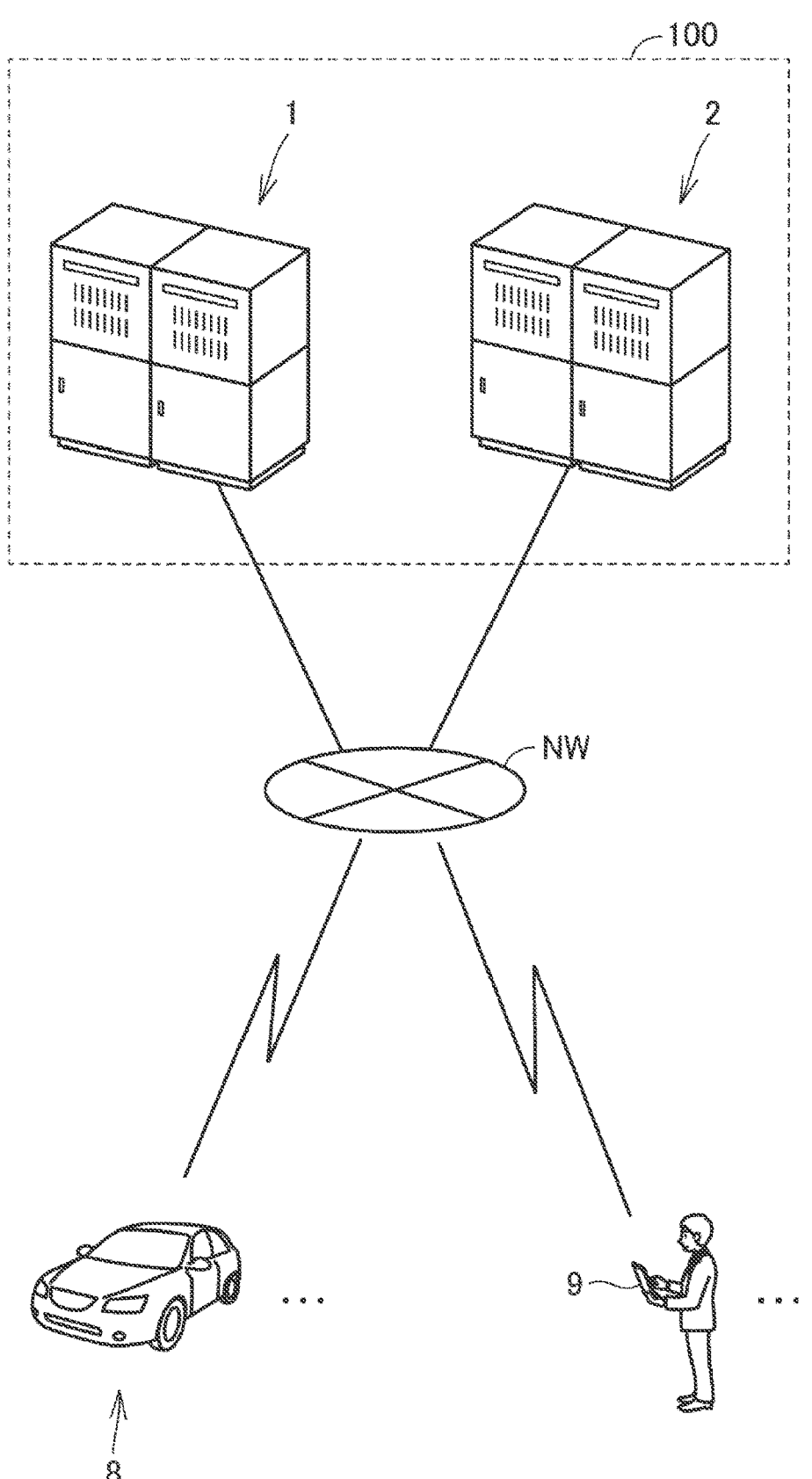
FIG. 1 is a diagram illustrating a schematic configuration of an information processing system according to a first embodiment of the present disclosure.

FIG. 1 is a diagram illustrating a schematic configuration of an information processing system ("software management system" according to the present disclosure) according to a first embodiment of the present disclosure. The information processing system 100 includes a flag distribution server 1 and an Over-The-Air (OTA) server 2. The flag distribution server 1 and the OTA server 2 are connected via a network NW so as to be able to communicate bidirectionally. Also, the flag distribution server 1 and the OTA server 2 are communicably connected to a plurality of vehicles 8 and a plurality of pieces of user equipment (UE) 9 via the network NW. Note that at least part of the network NW connecting the flag distribution server 1 or the OTA server 2 to the vehicles 8 is a wireless communication network.

The flag distribution server 1 is a server that provides flag data to each of a plurality of electronic control units (ECUs) installed in a vehicle. Flag data is software for performing switchover between an enabled state and a disabled state of a specific function (hereinafter referred to as "specific function") of software stored in a corresponding ECU among the ECUs. The specific function is typically a vehicle control function, such as a driver assistance function (such as an automated driving function or the like), for example. However, the type of specific function is not limited in particular, and may be a function unrelated to vehicle control, such as multimedia. The flag distribution server 1 is managed, for example, by a development corporation that develops specific functions. The flag distribution server 1 may be managed by a corporation that provides products or services related to specific functions. A configuration of the flag distribution server 1 will be described with reference to FIG. 2.

The OTA server 2 is a server that provides software for updating the software of each of the ECUs (hereinafter referred to as "update software"). The OTA server 2 is managed by, for example, a vehicle manufacturer that manufactures the vehicle itself (vehicle platform (VP)). A configuration of the OTA server 2 will be described later with reference to FIG. 2.

The vehicle 8 is managed by a user. The user is typically an individual, but may be, for example, a cooperate body that conducts business using the vehicle 8 (a transportation operator or the like). The vehicle 8 may be an automated vehicle. In this case, the OTA server 2 may be managed by a manufacturer of an automated driving system (ADS) installed in the VP, instead of or in addition to the vehicle manufacturer. Note, however, that the vehicle 8 may be a vehicle that can only be manually driven and that does not support automated driving.

The user equipment 9 is equipment that is operated by the user of the vehicle 8. The user equipment 9 may be a mobile terminal or a stationary terminal. Examples of the mobile terminal include smartphones, tablets, notebook personal computers (PCs), and wearable devices (smartwatches and so forth). Examples of the stationary terminal include desktop PCs.

Note that although only one vehicle 8 is illustrated in FIG. 1 due to space limitations in the drawing, any number of vehicles 8 may be included. The information processing system 100 normally includes a great number of vehicles 8. The same applies to the user equipment 9 as well.

Server Configuration

Figure 2:
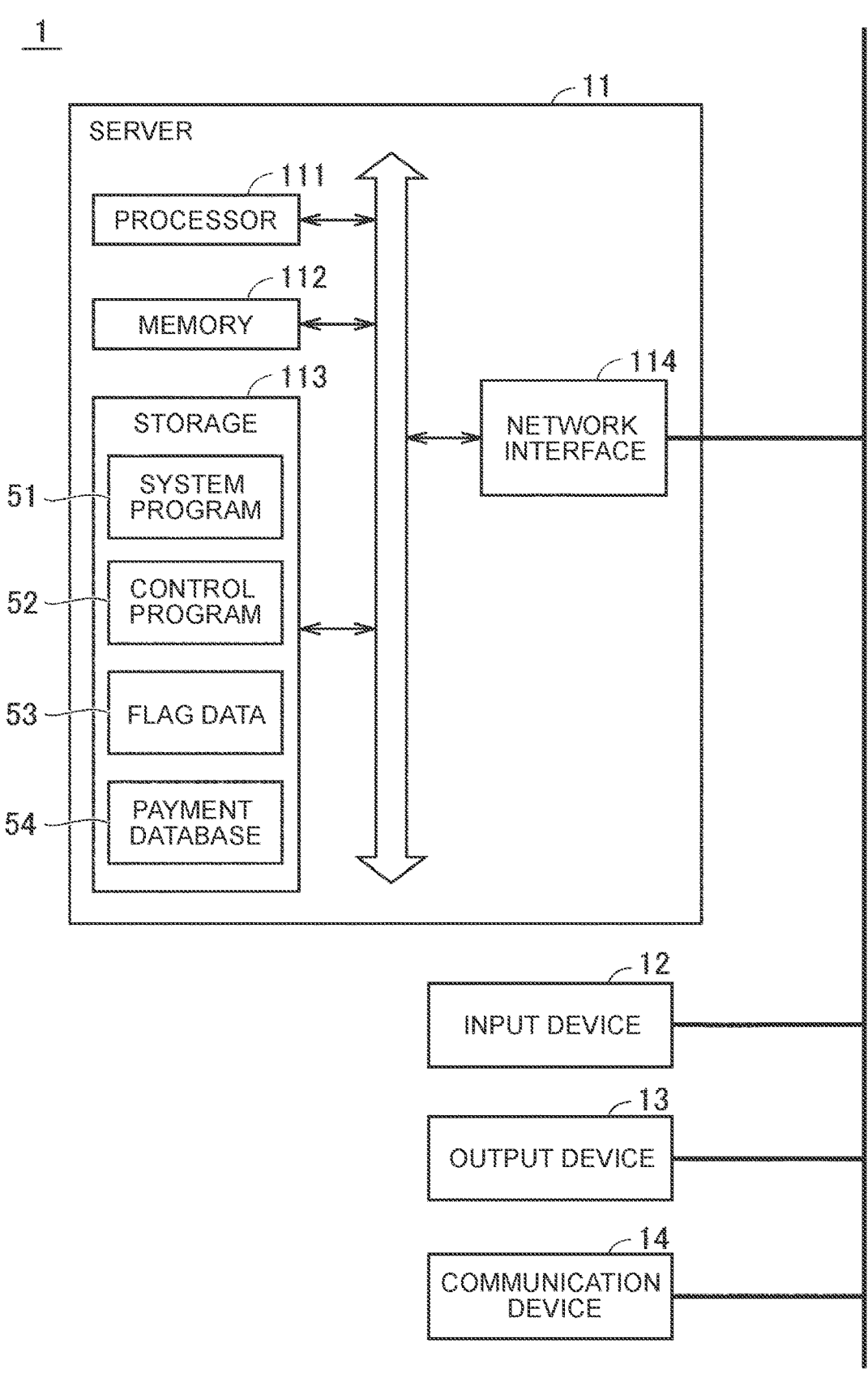
FIG. 2 is a block diagram illustrating a typical configuration example of a flag distribution server.

FIG. 2 is a block diagram illustrating a typical configuration example of the flag distribution server 1. The flag distribution server 1 includes a server 11, an input device 12, an output device 13, and a communication device 14. The server 11 includes a processor 111, memory 112, storage 113, and a network interface 114. Components of the flag distribution server 1 are connected to each other by a communication bus.

The processor 111 is, for example, a central processing unit (CPU) or a micro-processing unit (MPU). The memory 112 is volatile memory such as random-access memory (RAM) or the like. The storage 113 is rewritable nonvolatile memory such as a hard disk drive (HDD), a solid state drive (SSD), or flash memory, or the like. The storage 113 stores a system program 51 including an operating system (OS), a control program 52 including computer-readable code necessary for control computation, flag data 53, and a payment database 54 for managing payment information (described later) of the flag data 53. The processor 111 reads out the system program 51 and the control program 52, performs loading thereof to the memory 112, and performs execution thereof to implement various types of processing. The network interface 114 controls data communication that is performed among the server 11 and other devices (the vehicle 8, the user equipment 9, and so forth) via the communication device 14.

The input device 12 is a keyboard, a mouse, or the like, and receives input from an operator of the server 11. The output device 13 is a display, for example, and displays various types of information to the operator of the server 11.

Note that while FIG. 2 illustrates an example in which the server 11 includes one processor 111, the server 11 may include a plurality of processors. That is to say, the server 11 includes one or more processors. The same applies to the memory 112 and the storage 113 as well. As used in the present specification, the term "processor" is not limited to a processor in a narrow sense that performs processing in a stored-program mode, and may include hardwired circuits such as application specific integrated circuits (ASICs), field-programmable gate arrays (FPGAs), and so forth. Accordingly, the term "processor" may be read as processing circuitry of which the processing is defined in advance by computer-readable code and/or hardwired circuits.

Figure 3:
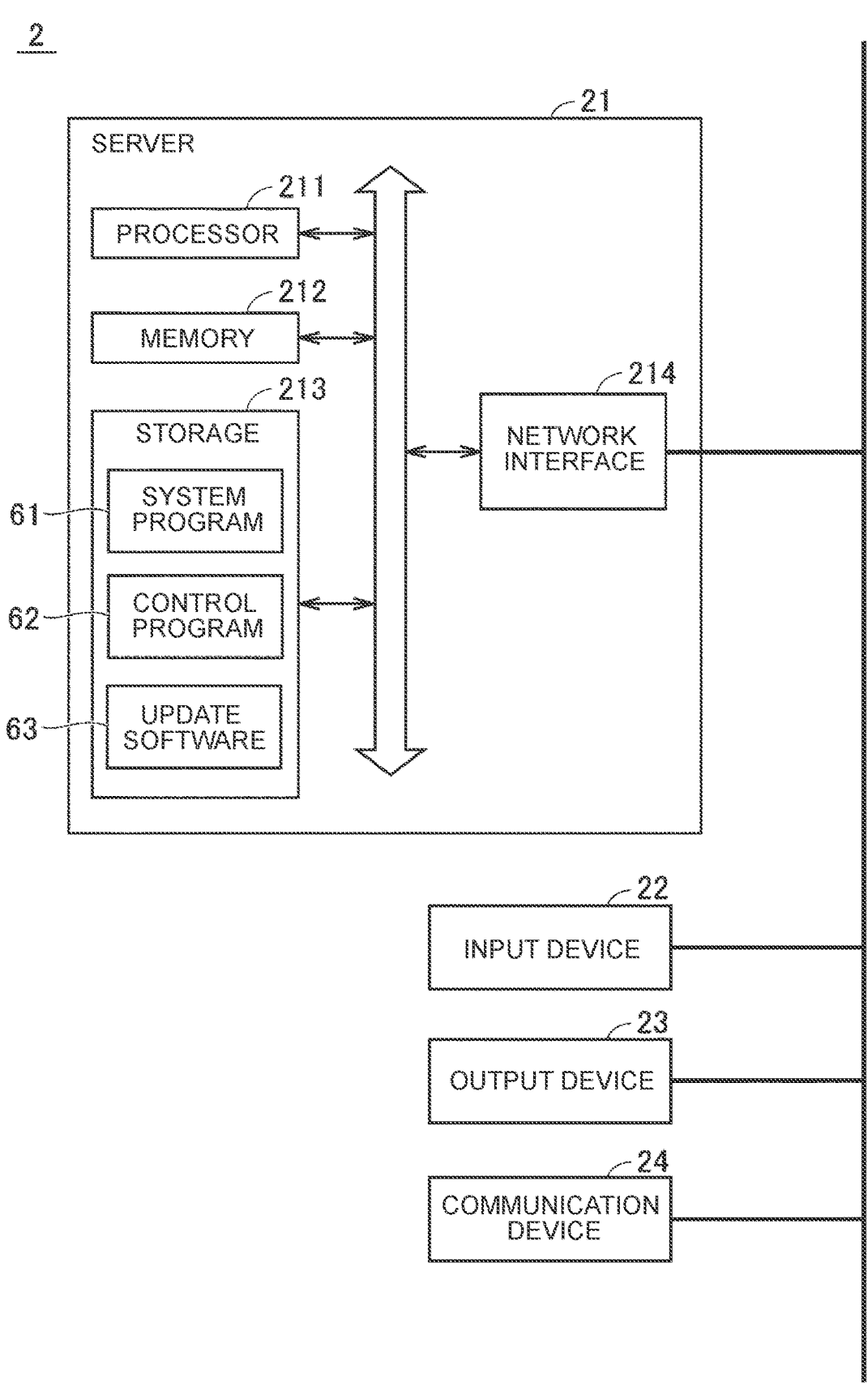
FIG. 3 is a block diagram illustrating a typical configuration example of an Over-The-Air (OTA) server.

FIG. 3 is a block diagram illustrating a typical configuration example of the OTA server 2. The OTA server 2 differs from the flag distribution server 1 with respect to the point that storage 213 includes update software 63 for updating software (control program) of the vehicle 8, instead of the flag data 53 and the payment database 54. Other configurations of OTA server 2 are the same as corresponding configurations of the flag distribution server 1, and accordingly detailed description thereof will not be repeated.

In the first embodiment, the flag distribution server 1 is an example of "server" or "computer" according to the present disclosure, and the OTA server 2 is an example of "external server" or "external computer" according to the present disclosure. The flag data 53 is an example of "first software" according to the present disclosure. The update software 63 is an example of "second software" according to the present disclosure. An ECU is an example of "electronic equipment" according to the present disclosure.

Software Updating

Figure 4:
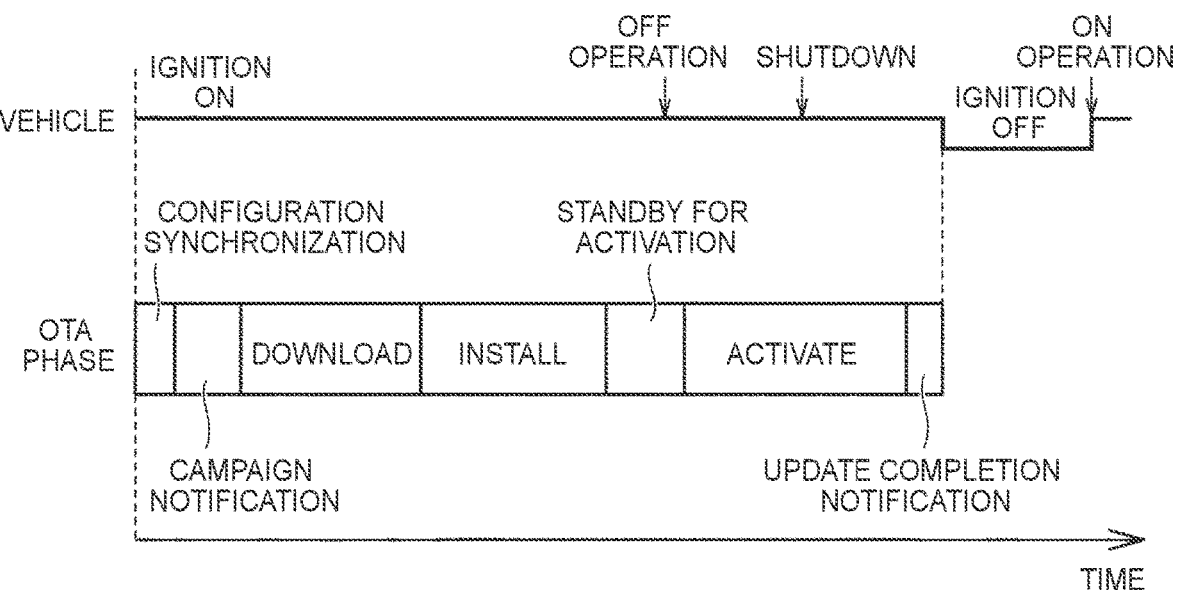
FIG. 4 is a diagram for describing an overview of software update processing.

FIG. 4 is a diagram for describing an overview of software update processing. An example will be described below in which exchange of information between the OTA server 2 and the user (notification from the OTA server 2, input operation by the user, and so forth) is performed via the vehicle 8, but part or all thereof may be performed via the user equipment 9. Of the ECUs included in the vehicle 8, an ECU that is the object of software update is referred to as a "target ECU", and an ECU that manages software updating is referred to as a "central ECU".

Processing related to software updating using OTA typically is a series of sequence processing that is performed in the order of configuration synchronization, campaign notification, software download, software installation, software activation (enabling), and update completion notification of the software. Each processing in this sequence processing will be described in further detail.

Configuration Synchronization

The vehicle 8 in an ignition (IG) on state repeatedly executes configuration synchronization for each time an amount of time set in advance elapses. The vehicle 8 also executes configuration synchronization when receiving a configuration synchronization request from the OTA server 2. Configuration synchronization processing by the vehicle 8 includes transmission processing of vehicle configuration information to the OTA server 2. The vehicle configuration information includes, for example, hardware information (information indicating product numbers of hardware, identifiers of ECUs, and so forth) and software information (information indicating product numbers of software, and so forth) for each ECU included in the vehicle 8.

Campaign Notification

Upon receiving the vehicle configuration information from the vehicle 8, the OTA server 2 checks for any campaign (updatable software) that is ongoing at that point in time. When there is a campaign applicable to the vehicle 8, the OTA server 2 transmits a campaign notification to the vehicle 8. A campaign notification is a signal requesting consent from the user of the vehicle 8 to update the relevant software to a new version. Campaign notifications may include, for example, a list of relevant vehicles, a list of target ECUs, information indicating the purpose of the software update, information indicating functions that the update may affect, and so forth. When the vehicle 8 receives the campaign notification, the vehicle 8 requests the user to perform an input operation regarding whether to consent to application of the campaign. For example, the vehicle 8 makes a display on a human-machine interface (HMI, omitted from illustration) of a message such as "New software found. Do you want to update?" or the like, and requests the user to perform an input operation indicating either consent or rejection.

Downloading

When the user performs an input operation indicating consent, the central ECU executes processing related to downloading of the software. More specifically, the central ECU requests the new software (distribution package containing this software) from the OTA server 2. The central ECU then receives the software from the OTA server 2 and stores it in non-volatile memory (omitted from illustration). After the saving is completed, the central ECU verifies the authenticity of the saved software. When the results of verification are "normal", the central ECU notifies the OTA server 2 that the download is complete. This notification means that the download was successful.

Installing

When the download is successful, the central ECU performs installation of the software. More specifically, the central ECU requests the target ECU to output the state of this target ECU and a diagnostic trouble code (DTC). The central ECU determines whether installation can be executed for each target ECU, based on the state of the target ECU and the DTC. The central ECU then transfers the new software (update data) to the target ECUs regarding which installation can be executed. Upon receiving the update data, the target ECU executes writing of the update data to the non-volatile memory.

When the transfer of the update data from the central ECU to the target ECU is completed, the target ECU transmits a transfer completion notification to the central ECU. Upon receiving the transfer completion notification, the central ECU requests the target ECU to perform integrity verification. The target ECU performs verification using the integrity verification data in response to a request from the central ECU, and transmits the verification results (installation complete/failed/cancelled) to the central ECU. When the verification results of all target ECUs are "normal", the central ECU notifies the OTA server 2 of the completion of installation. This notification means that the installation was successful.

Activating

When installation is successfully performed in succession to downloading, the central ECU goes to a state of standing by for activation. Thereafter, when an operation is performed to turn a power switch (omitted from illustration) of the vehicle 8 off, for example, the central ECU causes the HMI to display a predetermined message and requests the user to perform an input operation indicating either consent or rejection. When the user performs an input operation indicating consent, the central ECU executes activation of the software.

Note that when activation by the central ECU fails, the central ECU requests the OTA server 2 to roll back the software. When a request for a rollback is received from the vehicle 8, the OTA server 2 distributes software for rollback to the vehicle 8. Thus, the central ECU can restore the software regarding which activation failed to the original version, using the software for rollback. When the user performs an input operation indicating rejection, the central ECU cancels the processing relating to software updating, without executing the activation.

Software Update Completion Notification

Upon successful activation, the central ECU causes the HMI to display the results of the software update. Thereafter, the central ECU notifies the OTA server 2 of completion of the software update. This notification means that the OTA software update was successful. After transmitting the software update completion notification, the control system of the vehicle 8 shuts down, and the ignition turns off. When the power switch of the vehicle 8 is subsequently turned on, the control system of the vehicle 8 is started up and the ignition is turned on. This starts up the updated software in the target ECU.

Difference in Functions due to Payment

In the present embodiment, the software that is updated using OTA is configured to be capable of switchover of the enabled state and the disabled state of specific functions. In this example, a specific function is enabled when the user pays a fee for the specific function of the software (i.e., when the user pays to use the specific function of the software).

Figure 5:
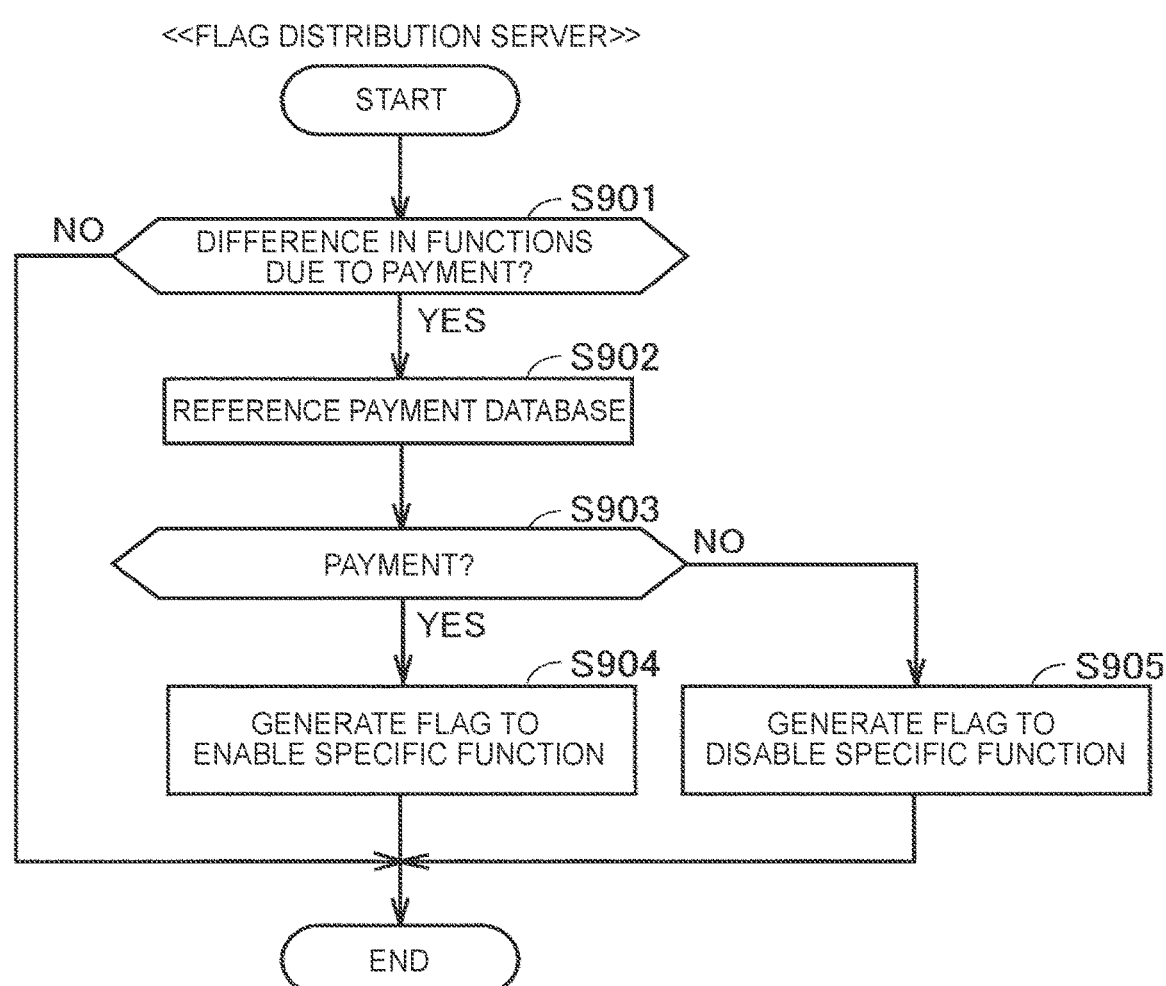
FIG. 5 is a flowchart showing processing procedures relating to enabling/disabling a specific function of software.

FIG. 5 is a flowchart showing processing procedures for enabling/disabling a specific function of software. This flowchart is executed, for example, when a condition that is set in advance is satisfied. Each step is realized by software processing by the flag distribution server 1 (server 11), but may be realized by hardware (electric or electronic circuits) disposed in the flag distribution server 1. Hereinafter, the term "step" will be abbreviated to "S."

In S901, the flag distribution server 1 determines whether there is difference in functions in the specific function of the software due to payment. Whether there is difference in functions due to payment is registered in advance. Also, whether the user has paid for a specific function (which of the functions the user has paid for) is associated with the user ID and stored in the payment database 54 (see FIG. 2). When there is difference in functions due to payment (YES in S901), the flag distribution server 1 refers to the payment database 54 (S902), and determines whether the user is paying for a specific function (S903).

When the user is paying for a specific function (YES in S903), the flag distribution server 1 generates a flag for enabling the specific function (S904). Conversely, when the user is not paying for the specific function (NO in S903), the flag distribution server 1 generates a flag for disabling specific function (S905). Note that when there is no difference in functions due to payment in S901 (NO in S901), the flag distribution server 1 ends the process without generating a flag for enabling/disabling the specific function.

Processing Flow

In the present embodiment, the software update process is selectively used depending on whether there is difference in functions due to payment regarding the specific function.

No Difference in Functions

Figure 6:
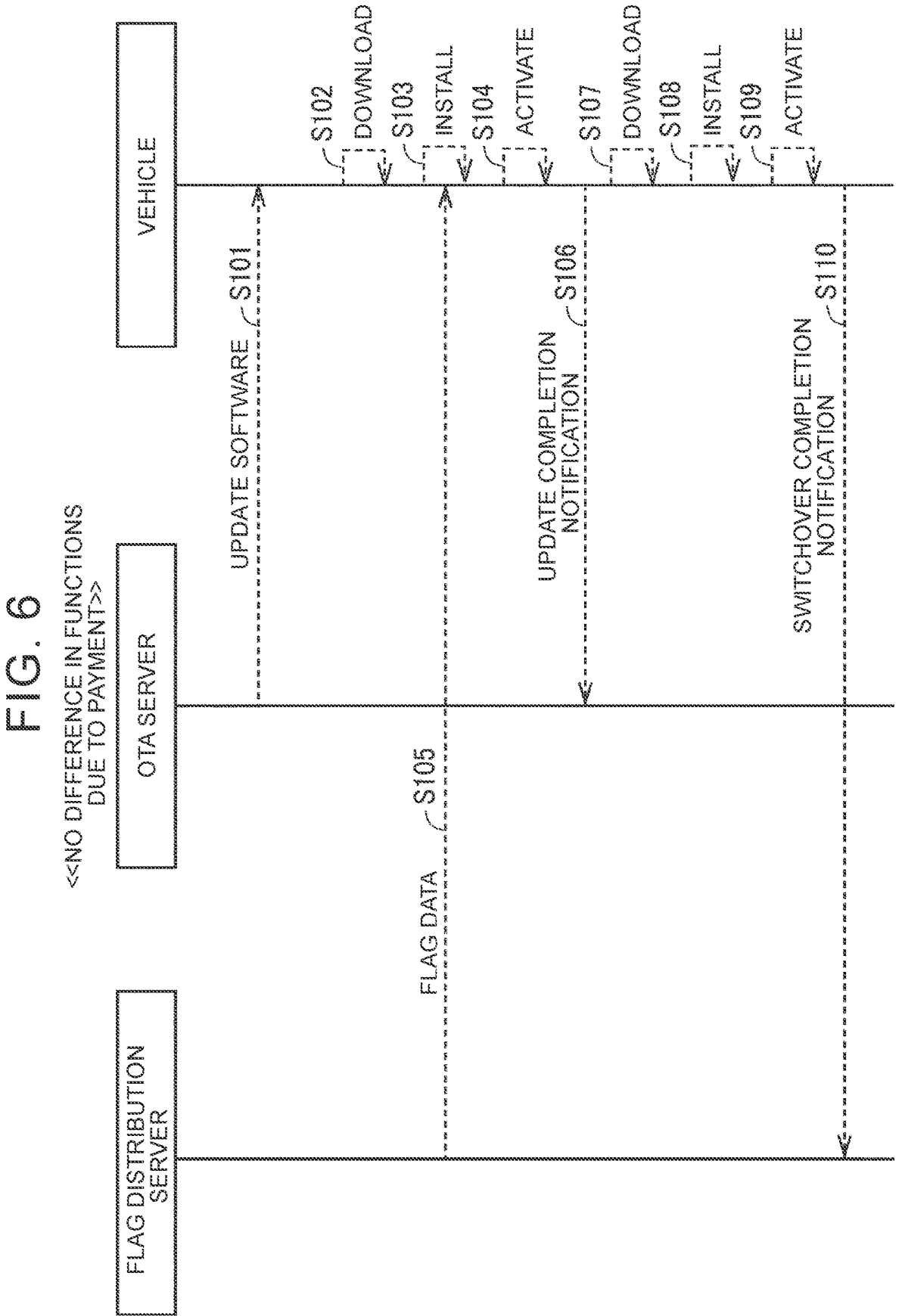
FIG. 6 is a sequence diagram showing an example of processing executed when there is no difference in functions due to paying for a specific function.

FIG. 6 is a sequence diagram showing an example of processing executed when there is no difference in functions due to paying for a specific function. In the drawing, processing executed by the flag distribution server 1, the OTA server 2, and the vehicle 8 (central ECU) is shown in order from left to right. The same applies to FIGS. 7 to 9, which will be described later.

Referring to FIG. 6, the OTA server 2 transmits the update software 63 to the vehicle 8 (S101). The vehicle 8 downloads, installs, and activates the update software 63 (S102 to S104). This sequence processing has been described in detail with reference to FIG. 4, and accordingly the description will not be repeated.

In this example, the flag distribution server 1 transmits the flag data 53 to the vehicle 8 during the sequence processing (download, installation, and activation) for the update software 63 (S105). The vehicle 8 then executes sequence processing for the flag data 53. That is to say, the vehicle 8 downloads, installs, and activates the flag data 53 (S107 to S109).

When the sequence processing for the update software 63 is completed, the vehicle 8 transmits to the OTA server 2 an update completion notification indicating that the software update has been completed (S106). Further, when the sequence processing for the flag data is completed, the vehicle 8 transmits to the flag distribution server 1 a switchover completion notification indicating that switchover of the flag has been completed (S110).

In the example in FIG. 6, the two sequence processes are completed normally, even when the flag data is received while the vehicle 8 is executing the reception processing of the update software. However, in an ECU in which part of the processing is shared between the sequence processing for update software 63 and the sequence processing for flag data 53, for example, the possibility of an error occurring due to interruption of execution of the sequence processing for update software 63 by the sequence processing for flag data 53 cannot be denied. As a result, the flag distribution server 1 and/or the OTA server 2 will need additional processing, such as retransmission of software for rollback or the like, and there is a possibility that the software will not be able to be updated smoothly.

Difference in Functions

Figure 7:
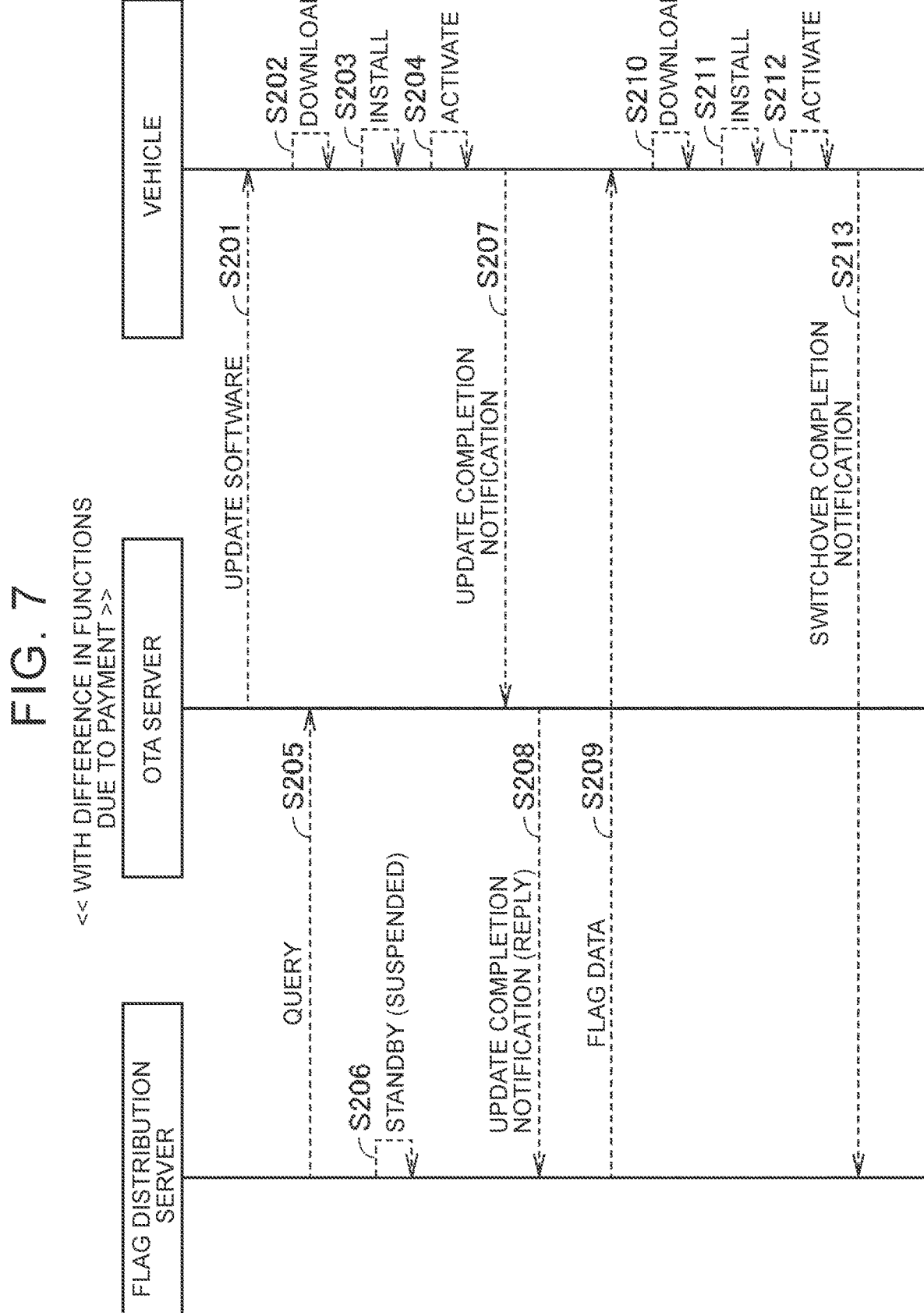
FIG. 7 is a sequence diagram showing an example of processing executed when there is difference in functions due to paying for a specific function.

FIG. 7 is a sequence diagram showing an example of processing executed when there is difference in functions due to paying for a specific function. The OTA server 2 transmits the update software 63 to the vehicle 8 (S201). The vehicle 8 downloads, installs, and activates the update software 63 (S202 to S204).

Prior to transmitting the flag data 53, the flag distribution server 1 queries the OTA server 2 regarding whether the update software has been transmitted to the vehicle 8 within a period that is set in advance and that is most recent (S205). The flag distribution server 1 stands by (suspends) regarding transmission of the flag data until a reply is received from the OTA server 2 (S206).

When the sequence processing for the update software 63 is completed, the vehicle 8 transmits an update completion notification to the OTA server 2 (S207). Upon receiving the update completion notification from the vehicle 8, the OTA server 2 transmits the update completion notification to the flag distribution server 1 (S208). This notification is equivalent to a reply to the query from the flag distribution server 1.

Upon receiving the reply from the OTA server 2, the flag distribution server 1 transmits the flag data 53 to the vehicle 8 (S209). The vehicle 8 downloads, installs, and activates the flag data 53 (S210 to S212). When the sequence processing for the flag data 53 is completed, the vehicle 8 transmits a switchover completion notification to the flag distribution server 1 (S213).

As described above, in the first embodiment, the flag distribution server 1 suspends the transmission of the flag data 53 until receiving the update completion notification from the OTA server 2, and transmits the flag data 53 to the vehicle 8 after receiving the update completion notification. When the sequence processing for the update software 63 is completed, the vehicle 8 transmits an update completion notification. This means that there is a possibility that the vehicle 8 is executing sequence processing (any one of processing of downloading, installing, or activating) regarding the update software 63 at a stage before receiving the update completion notification. Determination can be made that the sequence processing (activation) for the update software 63 has been completed at the stage of receiving the update completion notification, the flag distribution server 1 transmits the flag data 53 to the vehicle 8. This suppresses concurrent execution of sequence processing for two pieces of software (the update software 63 and the flag data 53), and accordingly no error occurs that would necessitate additional processing. Thus, the two pieces of software can be updated smoothly.

In the event of an error occurring when there is a difference in functions due to payment for a specific function, a situation may arise in which "a necessary function was not enabled even though it was paid for." Accordingly, as described with reference to FIG. 7, when there is difference in functions with regard to specific functions due to payment in particular, it is desirable to suspend transmission of the flag data 53 until receiving the update completion notification from the OTA server 2, so as to ensure that the sequence processing for the flag data 53 is executed. Thus, the situation described above can be circumvented in a sure manner.

Description has been made with reference to FIG. 6 that when there is no difference in functions regarding the specific function due to payment, the flag data 53 is transmitted to the vehicle 8 without standing by until the flag distribution server 1 receives the update completion notification. However, the flag distribution server 1 may suspend the transmission of the flag data 53 until receiving the update completion notification even if there is no difference in functions due to payment for the specific function. Thus, it is not indispensable to switch the transmission method of the flag data 53 depending on whether there is payment.

Note that while an example has been described in the present embodiment in which two pieces of software (the update software 63 and the flag data 53) are the object, a person skilled in the art will be able to easily understand that three or more pieces of software can be the object.

First Modification of First Embodiment

In the first embodiment, description has been made that whether the sequence processing (activation) for the update software 63 has been completed in the vehicle 8 is determined based on the update completion notification (S208) from the OTA server 2. However, the technique for determining whether activation of the update software 63 has been completed is not limited to this. Two other techniques will be described below with reference to first and second modifications. Note that for the sake of simplification, no consideration is given hereinafter to difference in functions due to payment for specific functions.

Figure 8:
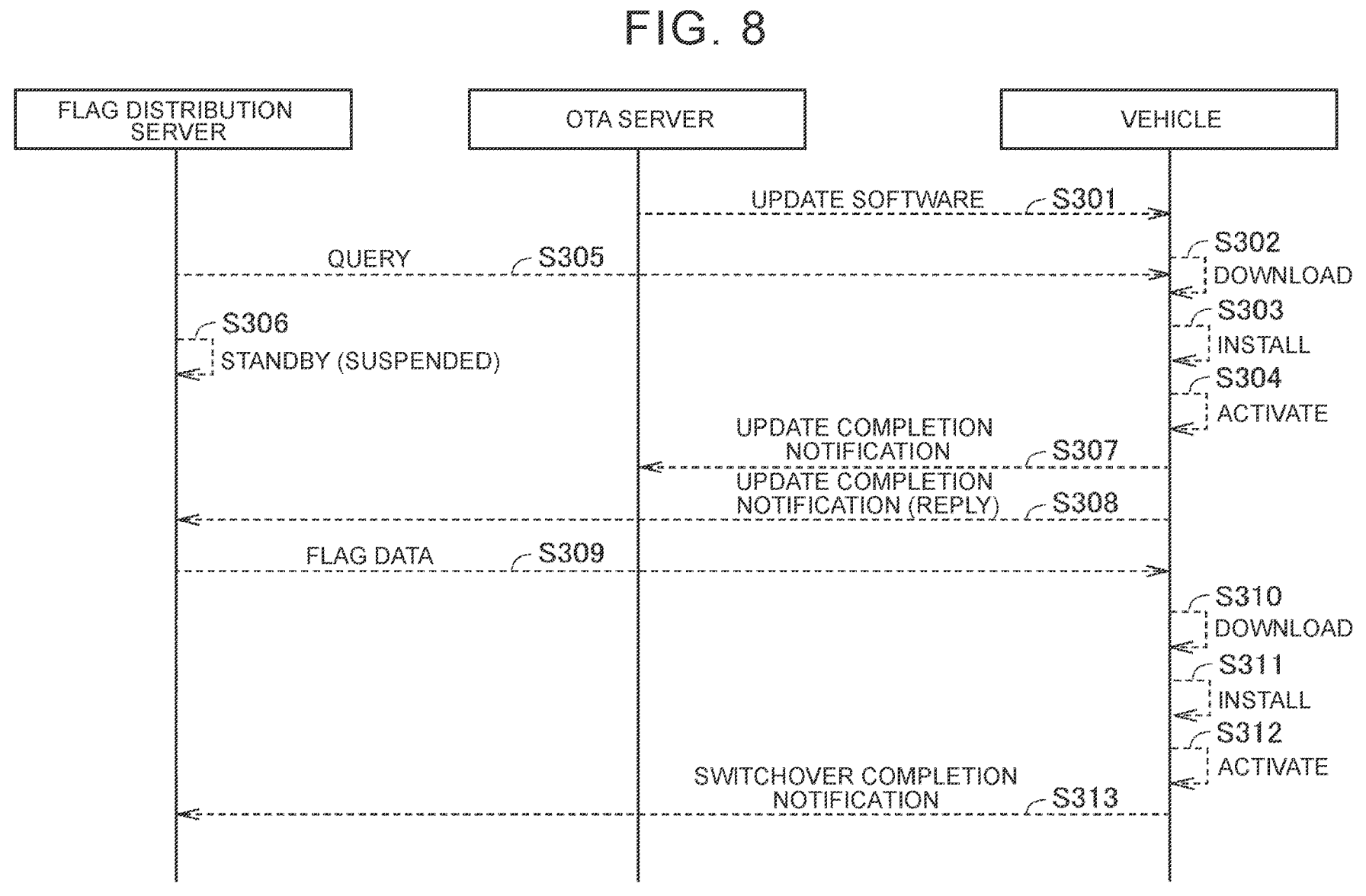

FIG. 8 is a sequence diagram showing an example of processing according to the first modification of the first embodiment. The OTA server 2 transmits the update software 63 to the vehicle 8 (S301). The vehicle 8 downloads, installs, and activates the update software 63 (S302 to S304).

Prior to transmitting the flag data 53, in the first modification the flag distribution server 1 queries the vehicle 8 regarding whether the update software 63 has been received within a period that is set in advance and that is most recent (S305). The flag distribution server 1 stands by (suspends) regarding transmission of the flag data 53 until a reply is received from the vehicle 8 (S306).

When the sequence processing for the update software 63 is completed, the vehicle 8 transmits an update completion notification to the OTA server 2 (S307). In addition, the vehicle 8 transmits an update completion notification to the flag distribution server 1 as well (S308). This notification is equivalent to a reply to the query from the flag distribution server 1.

Upon receiving the reply from the vehicle 8, the flag distribution server 1 transmits the flag data 53 to the vehicle 8 (S309). The vehicle 8 downloads, installs, and activates the flag data 53 (S310 to S312). When the sequence processing for the flag data 53 is completed, the vehicle 8 transmits a switchover completion notification to the flag distribution server 1 (S313).

Second Modification of First Embodiment

FIG. 9 is a sequence diagram showing an example of processing according to the second modification of the first embodiment. The OTA server 2 transmits the update software 63 to the vehicle 8 (S401). The vehicle 8 downloads, installs, and activates the update software 63 (S402 to S404).

Prior to transmitting the flag data, the flag distribution server 1 queries the OTA server 2 regarding whether the update software 63 has been transmitted within a period that is set in advance and that is most recent (S405). The flag distribution server 1 then stands by (suspends) regarding transmission of the flag data 53 (S406).

In the second modification, upon receiving a query from the flag distribution server 1, the OTA server 2 transmits a notification indicating that sequence processing for the update software 63 is being executed (processing-in-progress notification) to the flag distribution server 1, periodically or intermittently, for example. In the example shown in FIG. 9, a processing-in-progress notification is transmitted four times (S407 to S410). When the sequence processing for the update software 63 is completed, the vehicle 8 transmits an update completion notification to the OTA server 2 (S411). The OTA server 2 then ends the transmission of the processing-in-progress notification.

When no processing-in-progress notification has been received for a certain period of time, the flag distribution server 1 determines that the sequence processing (activation) for the update software 63 has been completed. This no-notification period is equivalent to a reply from the OTA server 2 to the query from the flag distribution server 1. When determining that activation of the update software 63 has been completed, the flag distribution server 1 transmits the flag data 53 to the vehicle 8 (S412). The vehicle 8 downloads, installs, and activates the flag data 53 (S413 to S415). Upon the sequence processing for the flag data 53 being completed, the vehicle 8 then transmits a switchover completion notification to the flag distribution server 1 (S416).

Description has been made with reference to FIG. 9 that the OTA server 2 transmits the processing-in-progress notification to the flag distribution server 1 as a reply to the query (S405) from the flag distribution server 1. However, the OTA server 2 may transmit the processing-in-progress notification to the flag distribution server 1 unprompted (i.e., even though there is no query from the flag distribution server 1).

Also, an example has been described here in which the processing-in-progress notification is transmitted from the OTA server 2 to the flag distribution server 1. However, the processing-in-progress notification may be transmitted from the vehicle 8 to the flag distribution server 1.

Second Embodiment

In a second embodiment, an example will be described in which the flag data 53 is transmitted to the vehicle 8 before the update software 63 is transmitted. Note that the configuration of the information processing system according to the second embodiment is the same as the configuration described with reference to FIGS. 1 to 3, and accordingly description thereof will not be repeated.

Figure 10:
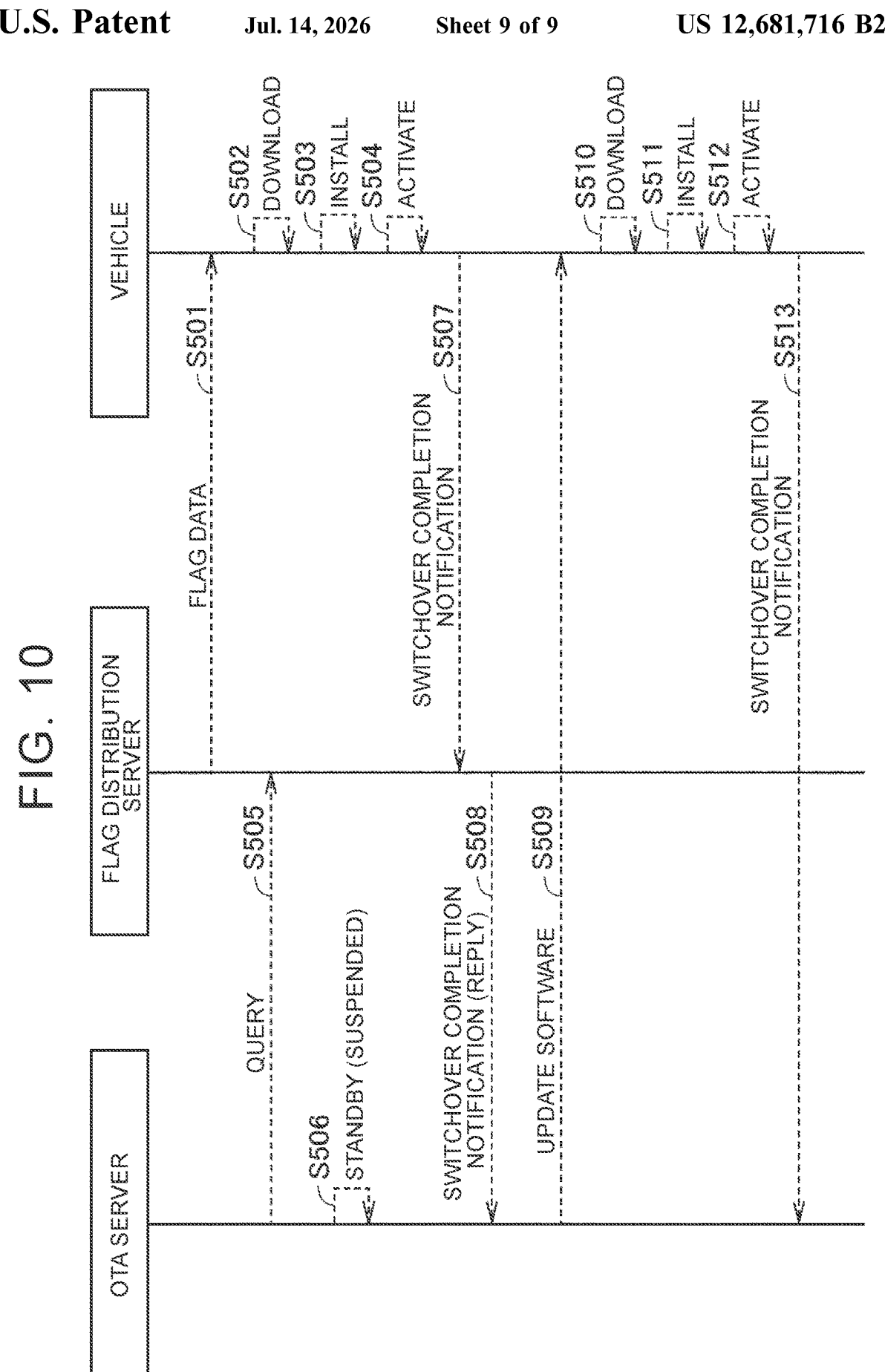
FIG. 10 is a sequence diagram showing an example of processing in a second embodiment.

FIG. 10 is a sequence diagram showing an example of processing according to the second embodiment. In the drawing, processing executed by the OTA server 2, the flag distribution server 1, and the vehicle 8 (central ECU) is shown in order from left to right.

The flag distribution server 1 transmits the flag data 53 to the vehicle 8 (S501). The vehicle 8 downloads, installs, and activates the flag data 53 (S502 to S504).

Prior to transmitting the update software 63, the OTA server 2 queries the flag distribution server 1 regarding whether the flag data 53 has been transmitted to the vehicle 8 within a period that is set in advance and that is most recent (S505). The OTA server 2 stands by (suspends) regarding transmission of the update software 63 until a reply is received from the flag distribution server 1 (S506).

When the sequence processing for the update software 63 is completed, the vehicle 8 transmits a switchover completion notification to the flag distribution server 1 (S507). Upon receiving the switchover completion notification, the flag distribution server 1 transmits the switchover completion notification (reply to the query) to the OTA server 2 (S508).

Upon receiving the switchover completion notification from the flag distribution server 1, the OTA server 2 transmits the update software 63 to the vehicle 8 (S509). The vehicle 8 downloads, installs, and activates the update software 63 (S510 to S512). Upon the sequence processing for the update software 63 being completed, the vehicle 8 then transmits an update completion notification to the OTA server 2 (S513).

As described above, in the second embodiment, the OTA server 2 suspends transmission of the update software 63 until receiving the switchover completion notification from the flag distribution server 1, and transmits the update software 63 to the vehicle 8 after receiving the switchover completion notification. Imposing such a condition enables confirmation that the sequence processing (flag switchover) of the flag data 53 has been completed at the point in time of transmission of the update software 63. This suppresses concurrent execution of sequence processing for the two pieces of software, and accordingly no error occurs that would necessitate additional processing. Thus, the two pieces of software can be updated smoothly.

Note that in the second embodiment, the OTA server 2 is an example of a "server" or a "computer" according to the present disclosure, and the flag distribution server 1 is an example of an "external server" or an "external computer" according to the present disclosure. The update software 63 is an example of "first software" according to the present disclosure. The flag data 53 is an example of "second software" according to the present disclosure.

In the same way as in the first embodiment, when there is no difference in functions regarding the specific function due to payment in the updated software, the update software 63 may be transmitted to the vehicle 8 without standing by until the OTA server 2 receives the switchover completion notification. Another method may be used in the second embodiment to determine whether activation of the flag data 53 has been completed (switchover of the flag), in the same way as in the first and second modifications of the first embodiment. That is to say, the OTA server 2 may suspend transmission of the update software 63 until receiving the switchover completion notification from the vehicle 8 (first modification). Alternatively, the OTA server 2 may suspend transmission of the update software 63 while periodically or intermittently receiving the processing-in-progress notification from the flag distribution server 1 (second modification) . One skilled in the art will readily appreciate that such modifications can be made.

The embodiments disclosed herein should be construed as exemplary in all respects and not restrictive. The scope of the present disclosure is shown by the claims rather than by the above description of the embodiment and is intended to include all modifications within the meaning and scope equivalent to the claims.

A server according to a first aspect of the present disclosure is configured to manage software of electronic equipment installed in a vehicle. The server includes storage in which first software is stored; and one or more processors configured to transmit the first software to the vehicle via a wireless communication device. The one or more processors are configured to determine whether activation processing of second software transmitted from an external server to the vehicle is completed at the electronic equipment, and transmit, when the activation processing of the second software is not completed, the first software to the vehicle after the activation processing of the second software is completed.

In the above aspect, the first software may be flag data for switchover between an enabled state and a disabled state of a specific function of the software. The second software may be update software for updating the software.

In the above aspect, the one or more processors may be configured to perform switchover between the enabled state and the disabled state of the specific function according to a fee payment status of a user of the vehicle.

In the above aspect, the one or more processors may be configured to transmit, when the software features difference in functions due to payment of fees, the flag data after completion of the activation processing of the update software, and transmit, when the software does not feature the difference in functions, the flag data without awaiting completion of the activation processing of the update software.

In the above aspect, the one or more processors may be configured to transmit the flag data after completion of the activation processing of the update software regardless whether the update software features difference in functions due to payment of fees.

In the above aspect, the first software may be update software for updating the software. The one or more processors may be configured to transmit, when the updated software features difference in functions due to payment of fees, the update software after completion of the activation processing of the second software, and on the other hand transmit, when the updated software does not feature the difference in functions, the update software without awaiting completion of the activation processing of the second software.

In the above aspect, the one or more processors may be configured to, when receiving a notification from the external server indicating that the activation processing of the second software is completed, determine that the activation processing of the second software is completed.

In the above aspect, the one or more processors may be configured to, when receiving a notification from the vehicle indicating that the activation processing of the second software is completed, determine that the activation processing of the second software is completed.

In the above aspect, at least one of the external server or the vehicle may be configured to transmit a notification to the processor indicating processing-in-progress of the second software by the electronic equipment. The one or more processors may be configured to determine that, when the notification is not received, the activation processing of the second software is complete.

A software management system according to a second aspect of the present disclosure includes the server according to the first aspect and an external server.

A software management method according to a further third aspect of the present disclosure manages software of electronic equipment installed in a vehicle. The software management method includes: performing a wireless transmission of first software from a computer to the vehicle; and determining whether activation processing of second software wirelessly transmitted to the vehicle from another computer is completed at the electronic equipment. The wireless transmission of the first software includes wirelessly transmitting, when the activation processing of the second software is not completed, the first software to the vehicle after the activation processing of the second software is completed.

A non-transitory storage medium according to a fourth aspect of the present disclosure, stores instructions that are executable by a computer and cause the computer to execute the software management method according to the third aspect.

What is claimed is:

1. A server that is configured to manage software for electronic equipment installed in a vehicle, the server comprising:
    a memory in which first software is stored; and
    one or more processors configured to transmit the first software to the vehicle via a wireless communication device, wherein
    the one or more processors are configured to
        determine whether second software previously transmitted from an external server to the vehicle has become enabled on the electronic equipment after having been downloaded and installed on the electronic equipment, and
        (i) when it has been determined that the second software has become enabled on the electronic equipment, transmit the first software to the vehicle, and
        (ii) when it has been determined that the second software has not become enabled on the electronic equipment, suspend transmitting of the first software to the vehicle until it is subsequently determined that the second software has become enabled, and then after subsequently determining that the second software has become enabled on the electronic equipment, transmit the first software to the vehicle,
    where the one or more processors determine that the second software has become enabled on the electronic equipment installed in the vehicle in response to receiving a notification from one of the external server and the vehicle.

2. The server according to claim 1, wherein:
    the first software is flag data for switchover between an enabled state and a disabled state of a specific function of the software; and
    the second software is update software for updating the software.

3. The server according to claim 2, wherein the one or more processors are configured to perform the switchover between the enabled state and the disabled state of the specific function according to a fee payment status of a user of the vehicle.

4. The server according to claim 2, wherein
    the one or more processors are configured to
        transmit, when the software features a difference in functions due to payment of fees, the flag data after it has been determined that the update software has become enabled, and
        transmit, when the software does not feature the difference in functions, the flag data without awaiting determination that the update software has become enabled.

5. The server according to claim 2, wherein the one or more processors are configured to transmit the flag data after it has been determined that the update software has become enabled regardless of whether the update software features a difference in functions due to payment of fees.

6. The server according to claim 1, wherein:
    the first software is update software for updating the software; and
    the one or more processors are configured to
        transmit, when the software after being updated features a difference in functions due to payment of fees, the update software after it has been determined that the second software has become enabled, and
        transmit, when the software after being updated does not feature the difference in functions, the update software without awaiting determination that the second software has become enabled.

7. The server according to claim 1, wherein the notification is from the external server.

8. The server according to claim 1, wherein the notification is from the vehicle.

9. The server according to claim 1, wherein:
    at least one of the external server and the vehicle is configured to transmit, to the one or more processors, a notification indicating processing-in-progress of the second software by the electronic equipment; and
    the one or more processors are configured to determine that, when the notification has not been received for a certain period of time, the second software has become enabled.

10. A software management system comprising:
    the server according to claim 1; and
    the external server.

11. A software management method for managing software of electronic equipment installed in a vehicle, the software management method comprising:
    performing a wireless transmission of first software from a computer to the vehicle; and
    determining whether second software previously wirelessly transmitted to the vehicle from another computer has become enabled on the electronic equipment after having been downloaded and installed on the electronic equipment, wherein
    the wireless transmission of the first software includes:
        (i) when it has been determined that the second software has become enabled on the electronic equipment, wirelessly transmitting the first software to the vehicle, and
        (ii) when it has been determined that the second software has not become enabled on the electronic equipment, suspending transmitting of the first software to the vehicle until it is subsequently determined that the second software has become enabled, and then after subsequently determining that the second software has become enabled on the electronic equipment, wirelessly transmitting the first software to the vehicle,
    wherein the computer determines that the second software has become enabled on the electronic equipment installed in the vehicle in response to receiving a notification from one of the another computer and the vehicle.

12. A non-transitory storage medium storing instructions that are executable by a computer and cause the computer to execute a software management method comprising:
    performing a wireless transmission of first software from a computer to a vehicle; and
    determining whether second software previously wirelessly transmitted to the vehicle from another computer has become enabled on an electronic equipment installed in the vehicle after having been downloaded and installed on the electronic equipment, wherein the wireless transmission of the first software includes:

(i) when it has been determined that the second software has become enabled on the electronic equipment, wirelessly transmitting the first software to the vehicle, and (ii) when it has been determined that the second software has not become enabled on the electronic equipment, suspending transmitting of the first software to the vehicle until it is subsequently determined that the second software has become enabled, and then after subsequently determining that the second software has become enabled on the electronic equipment, wirelessly transmitting the first software to the vehicle, wherein the instructions cause the computer to determine that the second software has become enabled on the electronic equipment installed in the vehicle in response to receiving a notification from one of the another computer and the vehicle.

* * * * *